Nov. 17, 1953         W. M. BARRET         2,659,882
METHOD OF PROSPECTING WITH TIMED ELECTRIC ENERGY
Filed Dec. 3, 1947

Inventor
William M. Barret
By
A. F. Flournoy
Attorney

Patented Nov. 17, 1953

UNITED STATES PATENT OFFICE 2,659,882

METHOD OF PROSPECTING WITH TIMED ELECTRIC ENERGY

William M. Barret, Shreveport, La.

Application December 3, 1947, Serial No. 789,502

18 Claims. (Cl. 343—12)

This invention relates to the art of electrical prospecting and provides an improved method of locating and identifying geologic formations and other subsurface masses.

The operation of the invention is based on determining the transit time of an electric impulse or wave that is transmitted into the earth and returned therefrom by reflection at a subsurface formation or other mass. The term "electric" is used here in its broadest sense, and as such may refer to both electrostatic and electromagnetic phenomena.

The invention is distinguished from earlier methods employing electric or mechanical energy by the use of novel wave paths and unique detecting and timing techniques.

One of the objects of the invention is to provide an improved method of determining the presence, thickness, depth and lateral extent of a geologic formation or other subsurface mass that reflects electric impulses or waves.

Another object is to furnish a useful method of identifying a geologic formation or other subsurface mass that reflects electric impulses or waves.

Another object is to make available a novel and convenient method of finding the effective refractive index of the geologic medium or media overlying a formation or other subsurface mass that reflects electric impulses or waves.

A further object is to provide a method of determining other useful geophysical and geologic information for which the invention is adapted.

The utility of the invention and its operation will be understood from the description that follows and the accompanying drawing, wherein.

Figure 1:
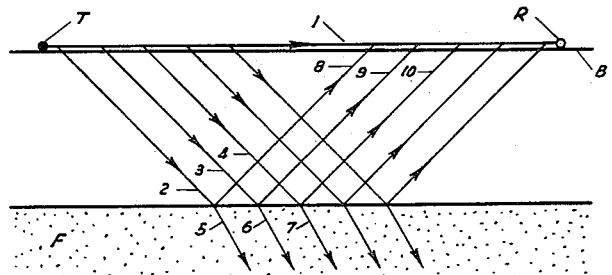
Fig. 1 is a diagrammatic illustration of the surface path and some of the underground paths along which electric energy travels from the transmitting means to the receiving means.

With reference to Fig. 1, if an electric impulse or wave is propagated as hereinafter described from the transmitter T along the air-earth boundary B it will first arrive at the receiver R in the form of a surface wave that travels the path 1. As the impulse or wave moves at approximately the speed of light from T to R, rays progressively "peel off" and are refracted into the earth along geometrically identical paths such as 2, 3 and 4. If the refracted rays are incident on a subsurface reflector such as the geologic formation F, they will be partially refracted along parallel paths like 5, 6 and 7, and partially reflected along similar paths as denoted by 8, 9 and 10. On reaching the air-earth boundary B, the reflected rays are refracted along the surface path 1, and reach the receiver R after the arrival of the surface wave. Inasmuch as the space phase and time phase of each of the multitude of reflected rays is the same at the receiver R, it is evident that their cumulative effect is enormously greater than would be that of a single ray or small bundle of rays, such as employed with earlier methods involving the transit time of electric or mechanical energy.

That the reflected rays illustrated in Fig. 1, which may originate at the radiating means hereinafter described, travel the paths indicated and arrive at the receiver in like time phase and like space phase has been demonstrated by field measurements made with a receiver along a traverse, such as TR of Fig. 1, when continuous electromagnetic energy of constant amplitude and constant frequency was being supplied by the transmitter. If the ray paths in the ground were non-parallel, a plot of field intensity against spread between the transmitter and receiver would be expected to reveal a series of maxima and minima in the measured field intensity. Such maxima and minima are not observed, although reflections are known to be present since the extent of a reflecting surface, such as the top of an ore deposit, can be determined therefrom. The parallel ray paths constitute the only mechanism that agrees with the observations and is in accord with the principles of optics. Such paths necessarily result in like time phase and like space phase of all the reflected rays at the receiver.

Figure 2:
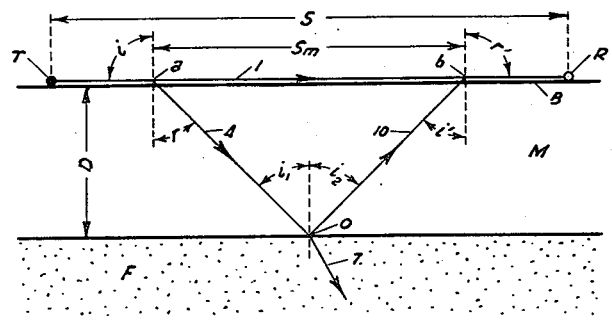
Fig. 2 is a diagrammatic representation of the wave that travels along the earth's surface from the transmitter to the receiver and an underground ray that is refracted into the earth and thence returned to the receiver by reflection at a subsurface formation.

In the preferred method of practicing the invention, it may be assumed without serious error that the energy from the transmitter T is incident on the boundary B at approximately 90 degrees, or at substantially grazing incidence, and hence it can be shown, in accordance with Snell's Law, that in Fig. 2 $\sin r = 1/n$, where $n$ is the refractive index of the geologic medium M overlying the formation F; $i_1 = i_2$, and $\sin r' = n \sin i'$.

The time required for an electric impulse or wave to travel from the transmitter T to the receiver R along the surface path 1 is $t_1 = S/c$, where $c$ is approximately $9.85 \times 10^8$ feet per second. The time required for the transmitted energy to travel the path $TaobR$ is given by:

$$t_2 = \frac{S - 2D\sqrt{n^2-1}}{c}$$

The difference in transit time between $t_1$ and $t_2$ is:

$$\Delta t = \frac{2D\sqrt{n^2-1}}{c} \quad (1)$$

and from this expression it is seen that when $n$ is known $\Delta t$ is a quantitative measure of the depth D of the formation F, and $\Delta t$ is also a quantitative measure of $n$ when D is known. A nomograph of Equation 1 may be so prepared that if any two of the quantities: $\Delta t$, D or $n$ are known, the third is immediately available.

The refractive index $n$ may therefore be readily found by measuring $\Delta t$ at a location where the depth of the reflector is known from drilling or otherwise. Using the value of $n$, quantitative depth determinations may then be made throughout the same general area from the $\Delta t$ values observed at different locations therein. In the absense of a known value for $n$, qualitative depth determinations may be arrived at from the $\Delta t$ values alone. In either event, the structural configuration and extent of the reflector may be displayed by contouring the depths or the $\Delta t$ values. Geologic features of economic importance may thereby be revealed.

It is important to note in Equation 1 that the spread S between the transmitter T and receiver R need not be known in carrying out the methods disclosed herein. This feature provides a distinguishing characteristic between the present invention and prior methods using timed electric energy or mechanical energy.

The only requirement for S is that it be not less than Sm (Fig. 2), which represents the minimum permissible spread for the detection of reflected energy from the reflector in question, and that it not be large enough to result in excessive attenuation of the energy arriving at the receiver.

In considering Figs. 1 and 2 it is to be understood that the refracted rays, such as denoted by 7, continue downward until they encounter other lithologic boundaries separating media having different refractive indices, and that from each such boundary reflected rays will travel back to the earth's surface B, and thence to the receiver R. By progressively increasing the separation between T and R, reflected energy from progressively deeper formations will thus appear at R. The depth of the investigation may accordingly be controlled by a suitable adjustment of the spread S.

The spread required to obtain reflected energy from a given depth varies with the type of electric energy employed and with the refractive indices of the geologic media involved. As a rough guide, which holds approximately throughout the Mid-Continent and Gulf Coast areas of the United States, the spread S must be twice the depth D to obtain "reflections."

This implies that the average value of the effective index of refraction of the media overlying the reflector is approximately 1.41 with respect to air. For this value of $n$, the transit time of the energy traveling the path $aob$ is twice the transit time of the energy traveling directly from $a$ to $b$ by the surface path 1. This relation is true irrespective of the depth D.

The ratio of the intensity of the energy arriving at R by the path $TaobR$ to that arriving by the path TR is indicative of the reflectivity of the reflecting boundary at $o$, which in turn is governed by the refractive indices of the media M and F. The intensity ratio thus provides a criterion for identifying certain formations and masses that are characterized by unusual values of $n$. For example, a metalliferous ore deposit ordinarily will have an abnormally high refractive index, and thereby give rise to a high intensity ratio, whereas a shale bed generally will cause a much lower intensity ratio. Experience with the invention will accordingly provide criteria for distinguishing between different reflectors, and for thereby identifying certain important subsurface formations and masses.

The transmitter T is to be regarded as a source of any form of electric energy that will travel substantially along the paths illustrated diagrammatically in Figs. 1 and 2, and the receiver R is to be considered any form of receiving means that will perform its required function when actuated by the electric energy emitted by the transmitting means T.

The preferred type of transmitting and receiving means employs alternating-current energy, either in the form of pulses or continuous waves of suitable character.

Figure 3:
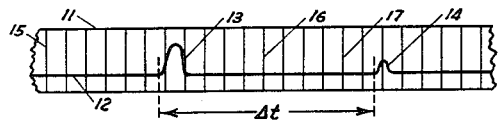
Fig. 3 illustrates the preferred manner of recording on a moving film the electric pulses detected at the receiver when a single subsurface reflector is involved in the operation.

Effective operation is obtained with comparatively simple apparatus when a single pulse comprising a limited wave train is propagated by the transmitter; detected by the receiver, and recorded on a film by means of an associated high-speed cathode-ray oscillograph. With this arrangement, the oscillograph record may appear as indicated in Fig. 3, where 11 is the film, 12 is the trace produced by photographing the fluorescent spot appearing on the screen of the cathode-ray tube, 13 represents the portion of the transmitted pulse that traveled the surface path TR of Fig. 2, and 14 represents the portion of the transmitted pulse that traveled the path $TaobR$. The difference in arrival times of the two recorded pulses is denoted by $\Delta t$, which may be determined with the aid of time markings such as 15, 16 and 17, or by knowing the speed of the moving film.

Pulse generators of the type here considered are too well known in the electronic art to require detailed consideration. Suffice it to say that the power output and carrier frequency must be suitable for exploring the earth to the required depths; the generated pulse should preferably be of rectangular shape, and its duration should be as long as can be tolerated without causing the received signals such as 13 and 14 of Fig. 3 to overlap in the case of the shallowest reflector to be investigated. For a reflector lying at a depth of 1,000 feet, it will be found that the signal 13 arrives at the receiver in approximately 2 microseconds, while the signal 14 reaches the receiver in about 4 microseconds, and from this it is seen that the pulse duration cannot exceed about 1.5 microseconds for the depth here considered. For deeper explorations the pulse duration may be advantageously increased, with the result that more waves and more energy are included in each pulse. In a particular application it was found that satisfactory results were obtained with a pulse generator that radiated approximately 100 watts at a carrier frequency of the order of 2 megacycles while generating a substantially rectangular pulse of 6 microseconds duration. Power, frequency and pulse duration are factors that may require modification to meet particular operating conditions, and for this reason it is advisable that the pulse generator permit their convenient variation. A method of determining the most effective frequency is disclosed in applicant's U. S. Patent No. 2,426,918, issued September 2, 1947, under the title: "Method for Electromagnetic-Wave Investigations of Earth Formations."

The power output of the pulse generator may be fed into one of the several types of radiating means disclosed in applicant's copending application Serial No. 757,242, filed June 26, 1947, now U. S. Patent No. 2,585,907, issued February 19, 1952. Alternatively, one side of the generator's output may be grounded and the other side may be connected to a single wire whose length approximates one-quarter the wave length of the carrier wave in air, and which is placed parallel to and about one foot above the earth, and directed toward the receiving means.

Suitable receivers for detecting the pulse are also well understood by those versed in the electronic art, and require little discussion here. The preferred form of receiver is characterized by high gain, and it should not be too sharply tuned because a short-duration pulse cannot cause oscillations to build up in very high-Q circuits. Increasing the pulse duration proportionally decreases the receiver and width and thereby permits the use of more sharply tuned circuits in the receiver. When combined with a transmitter having controllable pulse duration it is desirable that the receiver embody means for conveniently adjusting its sharpness of tuning.

The receiver is preferably energized by a loop antenna that is positioned a few feet above the ground, but it may be energized by the same form of antenna as specified for the transmitter.

The cathode-ray oscillograph used to record the receiver output may be of a type similar to that conventionally used in recording on film or sensitized paper such high-speed phenomena as lightning discharges, etc.

Figure 4:
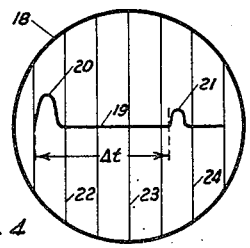
Fig. 4 illustrates a method of displaying the transient phenomena of Fig. 3 on a linear-sweep oscilloscope screen.

Alternatively, the oscillograph may be replaced by a cathode-ray oscilloscope, which may be arranged to produce a record similar to that appearing in Fig. 4, where 18 is the screen of a cathode-ray tube, 19 is a trace of the movement of the electron beam, 20 is the variation caused by a pulse that traveled the surface path from the transmitter to the receiver, 21 is the variation due to a pulse that traveled the underground paths from the transmitter to the receiver, and $\Delta t$ is the difference in arrival times of the two pulses of electric energy. With this arrangement, the receiver output is applied to the vertical plates of the cathode-ray tube, and the horizontal plates are actuated by a sweep circuit that goes into operation when signal 20 is received, and then causes the electron beam to move rapidly from left to right across the screen 18, whereupon the sweep circuit remains inactive until another signal is impressed on the vertical plates. The coating on the screen 18 is of a conventional type that causes the trace of the beam to remain visible for some 30 seconds. During this period the screen may be photographed for future reference or study, or $\Delta t$ may be determined directly in linear measure and then reduced to its true time interval by taking into account the sweep velocity, which may be made variable to accommodate different timing requirements. For a fixed sweep velocity, time markings such as 22, 23 and 24 make it possible to determine by inspection the magnitude of $\Delta t$.

In instances where multiple subsurface reflectors are involved in the operation of the herein disclosed invention, or where large depth intervals are being explored, or in cases requiring great precision of time measurement, it may be advantageous to employ a more elaborate spiral-sweep oscilloscope. With this instrument the signals 20 and 21 of Fig. 4 may appear as indicated by 25 and 26 respectively on the oscilloscope screen 27 of Fig. 5. Here again the trace of the electron beam remains visible for a sufficient time to measure $\Delta t$ with the aid of a transparent protractor whose graduations are determined by the sweep velocity.

Figure 5:
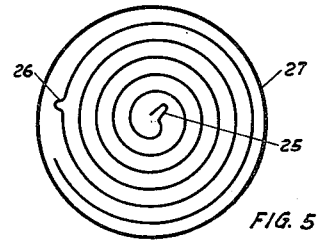
Fig. 5 illustrates a method of displaying the transient phenomena of Fig. 3 on a spiral-sweep oscilloscope screen.

It is clearly evident that the indications 20 and 21 of Fig. 4, and the indications 25 and 26 of Fig. 5, may be made to persist indefinitely if recurrent pulses were emitted by the transmitter, and if the linear-sweep circuit of Fig. 4 and the spiral-sweep circuit of Fig. 5 were synchronized therewith.

Thus far the discussion has concerned only apparatus adapted to the transmission and reception of electric pulses. It should be stated, however, that other forms of electric energy may also be employed in carrying out the method steps disclosed herein. For example, continuous electric waves provide a suitable form of energy. Apparatus adapted to the use of continuous waves may embody frequency-modulated transmitting and receiving means.

Figure 6:
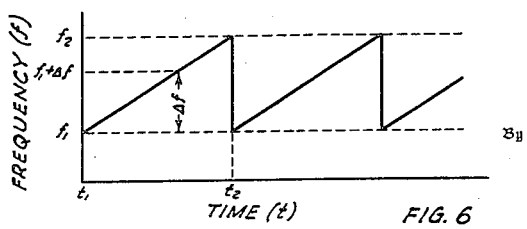
Fig. 6 shows diagrammatically the preferred manner of varying the frequency when frequency-modulated continuous waves are employed in practicing the invention.

The frequency-modulated transmitter may propagate waves of the type shown in Fig. 6, where it is seen that the frequency $f_1$ at time $t_1$ constantly increases to frequency $f_2$ at time $t_2$, then abruptly returns to frequency $f_1$ and repeats the cycle. If the instantaneous frequency of the wave reaching the receiver R via the path TR of Fig. 2 is $f_1 + \Delta f$ and the instantaneous frequency of the wave arriving at R by the path TaobR is $f_1$, then it will be understood that the frequency difference of the two received waves is a measure of the difference in their transit times from T to R. By mixing these two waves in a non-linear circuit incorporated in the receiver, there is developed a component of beat frequency $\Delta f$, the magnitude of which is determined by the difference in transit times of the two waves, which difference is expressed by $\Delta t$ of Equation 1. If the receiver were provided with a meter for measuring the value of frequency $\Delta f$, then it is obvious that this meter may be calibrated in units of time, or directly in appropriate units to indicate the depth of the subsurface reflector involved. Inasmuch as the depth calibration would depend in part on the refractive index of the geologic media overlying the reflector, the meter may comprise a multiplicity of depth scales based respectively on the values of $n$ to be encountered in operation, or alternatively, a single depth scale may be employed in connection with a deviation curve or chart to show directly the depth correction to be made to the meter indication for various departures in $n$, or a single time scale may be used in connection with a multiplicity of time-depth curves or charts based on different values of $n$. In any event, the magnitude of the beat frequency is proportional to the depth of the subsurface reflector involved in the operation, and hence when multiple reflectors are present, the indications of the meter may be limited to a selected reflector, or a predetermined depth interval, by providing ahead of the meter a variable band-pass filter which may be adjusted to pass only the beat frequencies related to the selected reflector, or the predetermined depth interval. For a technical discussion of band-pass filters, reference is made to: "Communication Engineering," W. L. Everitt, pp. 203–214, McGraw-Hill Book Company, Inc. (1937); "Measurements in Radio Engineering," F. E. Terman, pp. 356–364, McGraw-Hill Book Company, Inc. (1935).

A wide range is permissible in the design of apparatus adapted to the use of continuous-wave frequency-modulated energy. Apparatus employing an average carrier frequency of the order of 2 megacycles, with a total frequency swing of 100 kilocycles, and a repetition period of 40 microseconds, will be found suitable for many applications when the power radiated by the transmitter is some 80 watts. When using the type of frequency variation illustrated diagrammatically in Fig. 6, each "tooth" of the wave must persist for a sufficient time to permit the reception of signals traveling the paths TR and T$a$obR of Fig. 2.

Detailed discussions of apparatus suitable for transmitting and receiving either pulsed energy or energy in the form of continuous waves may be found in various publications, for example, in the textbooks entitled: "Principles of Radar," by members of the staff of the Radar School of the Massachusetts Institute of Technology, which was published in 1946 by McGraw-Hill Book Company, Inc., New York, and "Frequency Modulation," by August Hund, which was published in 1942 by the same publisher.

It is to be understood that the methods and apparatus disclosed herein are susceptible of various modifications without departing from the spirit or broad principles of the invention. For example, the single receiver denoted R in Figs. 1 and 2 may be replaced by multiple receivers, which preferably are positioned at spaced points along a substantially straight line that passes through the transmitter T. When so employed, multiple receivers sometimes prove useful in the recognition and identification of reflections from subsurface reflectors; they also make it possible to determine the dip of an inclined reflector from a single field set-up, and too, they are helpful when analyzing the additional reflections that generally appear as the spread between the transmitting means and the receiving means is increased. Other modifications will occur to those skilled in the art, for no attempt has been made to cover exhaustively the large variety of combinations of known apparatus and operating techniques that may readily be made as embodiments of the principles of the invention, the scope of which is defined in the following claims.

What is claimed as new and useful is:

1. In the art of investigating earth formations including a reflector of electric energy lying beneath the surface of the earth, the step of transmitting from a sending point electric energy along the earth's surface to a receiving point in a manner adapted to simultaneously and progressively refract some of said energy into the earth and downward along multiple substantially parallel paths onto said reflector and thence to said receiving point, and the step of detecting at said receiving point the energy that traveled along the earth's surface from said sending point to said receiving point and the energy that reached said receiving point by reflection at said reflector, wherein the reception of reflected energy is indicative of the presence of said reflector.

2. The method as set forth in claim 1, including the step of measuring at said receiving point the difference in arrival times of the energy that traveled along the earth's surface from said sending point to said receiving point and the energy that reached said receiving point by reflection at said reflector, wherein the magnitude of the difference in said arrival times is a measure of the depth of said reflector.

3. The method as set forth in claim 2, including the step of measuring at said receiving point the intensity of the energy that traveled along the earth's surface and the intensity of the energy that reached said receiving point by reflection at said reflector, wherein the ratio of the intensities is indicative of the nature of said reflector.

4. The method as set forth in claim 3, including the step of recording the signals arriving at said receiving point.

5. The method as set forth in claim 4, including the step of repeating the operations described for different separations between said sending point and said receiving point, wherein increasing the separation increases the depth of investigation and decreasing the separation decreases the depth of investigation.

6. The method as set forth in claim 1, wherein the refracted energy arriving at said receiving point is caused to strike said reflector at a location where its approximate depth is known, and including the step of measuring at said receiving point the difference in arrival times of the energy that traveled along the earth's surface from said sending point to said receiving point and the energy that reached said receiving point by reflection at said reflector, and the step of obtaining the effective refractive index of the earth media overlying said reflector from its predetermined non-linear mathematical relation to the magnitude of the difference in said arrival times and the known depth of said reflector.

7. The method as set forth in claim 1, wherein said electric energy transmitted from said sending point is in the form of frequency-modulated continuous waves, and wherein the step of detecting the energy arriving at said receiving point includes filtering the received energy to emphasize the detection of reflected energy from a selected reflector.

8. The method as set forth in claim 1, wherein said energy transmitted from said sending point is a single pulse of electric energy.

9. The method as set forth in claim 1, including the step of measuring at said receiving point the difference in arrival times of the energy that traveled along the earth's surface from said sending point to said receiving point and the energy that reached said receiving point by reflection at said reflector, and wherein said energy transmitted from said sending point is in the form of a series of recurrent like pulses of electric energy, the time duration of each pulse being less than said difference in arrival times of the energy reaching said receiving point, whereby the magnitude of said difference in arrival times is a measure of the depth of said reflector.

10. In the art of investigating earth formations including a reflector of electromagnetic waves lying beneath the surface of the earth, the step of simultaneously propagating from a sending point frequency-modulated continuous waves along the earth's surface to a receiving point and through the earth to said reflector and thence to said receiving point, and the step of measuring at said receiving point the difference in arrival times of the waves that traveled along the earth's surface from said sending point to said receiving point and the waves that reached said receiving point by reflection at said reflector, said difference in arrival times being measured with a frequency-responsive device that is calibrated in units of time, said units of time being a measure of the depth of said reflector.

11. In the art of investigating earth formations including a reflector of electromagnetic waves lying beneath the surface of the earth, the step of simultaneously propagating from a sending point frequency-modulated continuous waves along the earth's surface to a receiving point and through the earth to said reflector and thence to said receiving point, and the step of measuring at said receiving point the difference in arrival times of the waves that traveled along the earth's surface from said sending point to said receiving point and the waves that reached said receiving point by reflection at said reflector, said difference in arrival times being measured with a frequency-responsive device that indicates directly the depth of said reflector.

12. In the art of investigating earth formations including a reflector of electric energy lying beneath the surface of the earth, transmitting from a sending point electric energy of a selected frequency along the earth's surface to a receiving point in a manner adapted to simultaneously and progressively refract some of said energy into the earth and downward along multiple substantially parallel ray paths onto said reflector and thence to said receiving point, measuring at said receiving point the difference in arrival times of the energy that traveled along the earth's surface from said sending point to said receiving point and the energy that reached said receiving point by reflection at said reflector, measuring at said receiving point the intensity of the energy that traveled along the earth's surface to said receiving point, and measuring at said receiving point the intensity of the energy that reached said receiving point by reflection at said reflector, wherein the magnitude of the difference in said arrival times is a measure of the depth of said reflector, and wherein the ratio of said first mentioned intensity and said last mentioned intensity is indicative of the nature of said reflector.

13. The method as set forth in claim 12 including the step of controlling the depth of investigation by varying the separation between said sending point and said receiving point.

14. In the art of investigating earth formations including a reflector of electromagnetic waves lying beneath the surface of the earth, simultaneously propagating from a sending point frequency modulated continuous waves along the earth's surface in a manner adapted to simultaneously and progressively refract some of said energy into the earth and downward along multiple substantially parallel ray paths onto said reflector and thence to said receiving point, and measuring at said receiving point the difference in arrival times of the waves that traveled along the earth's surface from said sending point to said receiving point and the energy that reached said receiving point by reflection at said reflector in order to determine the depth of said reflector.

15. In the art of investigating earth formations including a reflector of electromagnetic waves lying beneath the surface of the earth, transmitting from a sending point electric energy of a selected frequency along the earth's surface to a receiving point in a manner to refract some of said energy into the earth and downward onto said reflector and thence to said receiving point so that a single definite reflection reaches said receiving point from each such reflector, and measuring at said receiving point the difference in arrival times of the energy that traveled along the earth's surface from said sending point to said receiving point and the energy that reached said receiving point by reflection.

16. The method as set forth in claim 15, in which the receiving point is located a random distance from the sending point.

17. In the art of investigating earth formations including a reflector of electromagnetic waves lying beneath the surface of the earth, transmitting from a sending point electric energy of a single selected radio frequency along the earth's surface to a receiving point in a manner to refract some of said energy into the earth and downward onto said reflector and thence to said receiving point so that a single definite reflection reaches said receiving point from each such reflector, measuring at said receiving point the intensity of the energy that traveled along the earth's surface to said receiving point, and measuring at said receiving point the intensity of the energy that reached said receiving point by reflection, wherein the ratio of said first mentioned intensity and said last mentioned intensity is indicative of the nature of said reflector.

18. In the art of investigating earth formations including a reflector of electromagnetic waves lying beneath the surface of the earth, transmitting from a sending point electric energy in the form of frequency modulated continuous waves along the earth's surface to a receiving point in a manner to refract some of said energy into the earth and downward onto said reflector and thence to said receiving point so that a single definite reflection reaches said receiving point from said reflector, causing said refracted energy to strike said reflector at a location where its approximate depth is known, and measuring at said receiving point the difference in arrival times of the energy that traveled along the earth's surface from said sending point to said receiving point and the energy that reached said receiving point by reflection at said reflector, wherein the effective refractive index of the earth media overlying said reflector may be obtained from its predetermined non-linear mathematical relation to the magnitude of the difference in said arrival times and the known depth of said reflector.

WILLIAM M. BARRET.

References Cited in the file of this patent

UNITED STATES PATENTS

| Number | Name | Date |
|---|---|---|
| Re. 21,955 | Chaffee | Nov. 25, 1941 |
| 2,077,707 | Melton | Apr. 20, 1937 |
| 2,139,460 | Potapenko | Dec. 6, 1938 |
| 2,236,893 | Chaffee | Apr. 1, 1941 |
| 2,268,643 | Crosby | Jan. 6, 1942 |
| 2,364,209 | Green | Dec. 5, 1944 |
| 2,412,003 | Neufeld | Dec. 3, 1946 |
| 2,453,169 | Varian | Nov. 9, 1948 |

FOREIGN PATENTS

| Number | Country | Date |
|---|---|---|
| 854,569 | France | Apr. 19, 1940 |